UNITED STATES PATENT OFFICE.

FREDERICK GEORGE JORDAN, OF SPOKANE, WASHINGTON.

PROCESS OF MAKING CEMENT.

SPECIFICATION forming part of Letters Patent No. 702,009, dated June 10, 1902.

Application filed July 11, 1901. Serial No. 67,921. (No specimens.)

*To all whom it may concern:*

Be it known that I, FREDERICK GEORGE JORDAN, a citizen of the United States, residing at Spokane, in the county of Spokane and State of Washington, have invented a new and useful Process of Making Cement, of which the following is a specification.

This invention relates to the manufacture of Portland cement, and has for its object in a ready, expeditious, cheap, and thoroughly practical manner to effect production of a uniform and high grade hydraulic cement.

The manufacture of Portland cement is usually accomplished by two procedures known commercially as the "wet" or "English" process and the "dry" or "German" process. Both of these processes have inherent disadvantages that under the procedures as practiced are practically impossible of elimination.

Briefly stated, under the procedure of the wet process the separate materials, all of which are of necessity soft in character, are first mixed, then ground in water, then conveyed to settling-backs, where precipitation of the materials is effected, after which the materials are dried by artificial heat into large masses, and these masses are then broken up into lumps, which are burned and then ground to powder. The disadvantages of this procedure are that the different materials, which vary in grade and in specific gravity, precipitate irregularly, so that the resulting mixture lacks uniformity of character, and hence the product obtained is of necessity inferior in quality and practically of low grade. Further, this procedure requires large areas of settling-backs, consumes a large amount of time in the removal of the superfluous water, and necessitates the expenditure of large sums of money in fuel to effect the evaporation of the water from the mixture to bring it to a condition where it may be broken or disintegrated preparatory to burning.

Under the procedure of the dry process the separate materials, usually of soft or indurated character, are mixed and incorporated by dry grinding, sufficient water being applied to the powder to present a plastic mass, and this is then taken and molded into blocks, which are burned and finally ground to a fine powder. The disadvantage of this procedure is the great cost of the grinding machinery to effect reduction of the mixture to a powder, and where the materials are hard in character their reduction to the finely-divided condition necessary to the production of a high-grade Portland cement will render the procedure so costly as practically to inhibit its adoption.

Under the procedure of my invention I secure the desired results by the employment of natural forces, these to be utilized in a manner that will produce the highest and most satisfactory results with a minimum expenditure of both time and money.

In carrying my process into effect I take a material containing a high percentage of lime, such as chalk or mountain-limestone, the latter by preference to be of the class known as "rich" limestone, and this I calcine in a suitable kiln under a heat of from 1,200° to 1,500° Fahrenheit. This step may be carried into effect in any preferred manner and by the employment of any character of kiln suited to the purpose, and I have found in practice that by the employment of kiln separated from but communicating with a furnace in such manner that while all of the highly-heated products of combustion are utilized to decarbonate the lime all of the ashes, smoke, and other unconsumed products of combustion are excluded therefrom the best results are attained. The form of furnace employed for effecting calcination of the lime-bearing substance may be an ordinary muffle-furnace or a coke-oven. I then take the decarbonated lime and while in an incandescent state mix with it a predetermined quantity of clay, shale, or other like material containing the necessary silica and alumina, this material to be in its native condition—that is to say, as taken from the excavation and containing more or less moisture. The best results are secured where the ratio of silica to alumina and iron approximates or exceeds the proportion of three to one, the required proportions of ingredients being determined by sampling and chemical analysis prior to the admixture of the lime with the silica and alumina bearing clays, the object had in view by proportion of the different materials being to secure a resulting cement composed of from sixty-two per cent. to sixty-eight per cent. of lime with silica, alumina, and iron in a ratio approximating or somewhat exceeding three parts of the former to one part of the latter. In the selection of the raw materials I reject any that will result in a cement containing more than seven per cent. magnesia, as this is a deterrent to the production of a high-grade cement; but the presence of a small percentage of alkali is not objectionable. The mixture of lime and clay of the character specified is discharged into an air and steam tight revoluble muller and mixer fitted with appropriate valve-controlled cold or hot water, steam, cold or hot air blasts or supplies, wherein the materials, although of variable character, are equally well and perfectly disintegrated and rapidly mixed, the rapidity with which the operation is performed being under the control of the operator by adjusting the blasts or forces according to the work to be done. The lime being perfectly decarbonated is in a condition for impalpable disintegration by natural forces—that is to say, by subjecting it in its incandescent state to either water, steam, or air, the disintegration of the lime under these conditions being rapid and perfect to impalpability. The muller is a cylinder having its ends closed and is mounted on trunnions, whereby it may be tilted when the operation is completed, and may be built somewhat on the lines of an ordinary Bessemer converter, provision being made whereby the same shall be rotated upon its longitudinal axis, and this muller contains a plurality of loose steel balls, which under the rotation of the muller effects rapid disintegration and perfect mixing of all of the materials. In the case where hard compact mountain-limestone is employed, to hasten disintegration an excess of either water or steam, or both, with or without air, may be employed. Under these conditions all of the steam and vapors are retained by the substances, resulting in the presentation of a hot, impalpable, homogeneous mass of any desired degree of temperature or moisture and in a perfect condition to be subsequently pressed into briquets or blocks, which harden upon cooling.

In addition to the employment of steam or water jets or blasts with some kinds of material advantageous results are secured by introducing to the mass while in the muller a solution, such as silicate of soda, which not only acts to cement the minute particles together when subjected to pressure, but readily acts as a flux in the transformation of the lime and silicates into the necessary doublesilicate of lime, forming Portland cement.

The discharge of the charge of hot, moist, impalpable materials directly into the bin or hopper of the block or briqueting machine is effected by tilting the muller, and as the revolution of the muller continues even when tilted the charge is rapidly and cleanly discharged.

The block or briqueting machine may be of any suitable character, it being preferred, however, to employ one exerting as high pressure upon the mass as possible, as I have found in practice that the more tightly the material is compressed the better the blocks stand the passage through the kiln and also that the resulting cement is of better quality, being of higher specific gravity.

The advantages I claim for my procedure over what has heretofore been practiced in the art is rapidity and cleanliness of operation, the perfect impalpability of the treated material, the small output of power required to accomplish the process, the employment of natural forces in lieu of high power, the simplicity and small cost of a plant to carry out the procedure, the comparatively small space required, the positive control of the output during the course of its preparation, and the universality of the process, it being equally suited to both soft and hard limestones.

What is claimed is—

1. The herein-described method of making Portland cement, which consists in decarbonating a lime-bearing substance, mixing therewith, while in an incandescent state, a suitable quantity of silicious clay, and then agitating the mixture in the presence of a hydrating agent.

2. The herein-described method of making Portland cement which consists in decarbonating a lime-bearing substance, mixing therewith, while in an incandescent state, a suitable quantity of moist silicious clay and then agitating the mixture in the presence of a hydrating agent.

3. The herein-described method of making Portland cement which consists in decarbonating limestone, mixing therewith, while in an incandescent state, a suitable quantity of silicious clay, and then agitating the mixture in the presence of a hydrating agent.

4. The herein-described method of making Portland cement which consists in decarbonating limestone, mixing therewith, while in an incandescent state, a suitable quantity of silicious clay and then agitating the mixture in an air-tight holder in the presence of a hydrating agent.

5. The herein-described method of making Portland cement which consists in decarbonating limestone, mixing therewith, while in an incandescent state, a suitable quantity of silicious clay, then passing the materials to an air-tight holder and introducing into the mixture a fluxing agent, and then agitating the mixture in the presence of a hydrating agent.

6. The herein-described method of making Portland cement which consists in decarbonating limestone, mixing therewith, while in an incandescent state, a suitable quantity of silicious clay, then passing the materials to an air-tight holder and introducing into the mixture a solution of silicate of soda and then agitating the mixture in the presence of a hydrating agent.

7. The herein-described method of making Portland cement which consists in decarbonating limestone, mixing therewith, while in an incandescent state, a suitable quantity of silicious clay, then agitating the mixture in the presence of a hydrating agent, and effecting thorough commingling of the materials, then molding, then burning, and finally reducing to a pulverulent mass.

8. The herein-described method of making Portland cement which consists in decarbonating limestone, mixing therewith, while in an incandescent state, a suitable quantity of silicious clay, then passing the materials to an air-tight holder and introducing into the mixture a binding and fluxing agent, and then agitating the mixture in the presence of a hydrating agent.

In testimony that I claim the foregoing as my own I have hereto affixed my signature in the presence of two witnesses.

FREDERICK GEORGE JORDAN.

Witnesses:
C. E. DOYLE,
FRANK S. APPLEMAN.